G. M. & C. C. RICHARDSON,

Assignors, by mesne assignments, to W. H. FIELD & C. M. SHARP.

Horse Hay-Rake.

No. 9,258. Reissued June 15, 1880.

Attest,
W. H. H. Knight
W. Blackstock.

Inventor
George M. Richardson
Chas. C. Richardson
By Hill & Church
their attys.

N. PETERS, PHOTO-LITHOGRAPHER, WASHINGTON, D. C.

UNITED STATES PATENT OFFICE.

GEORGE M. RICHARDSON AND CHARLES C. RICHARDSON, OF DANA, MASS., ASSIGNORS, BY MESNE ASSIGNMENTS, TO WILLIAM H. FIELD, OF PORT CHESTER, AND CHARLES M. SHARP, OF ITHACA, N. Y.

HORSE HAY-RAKE.

SPECIFICATION forming part of Reissued Letters Patent No. 9,258, dated June 15, 1880.

Original No. 89,169, dated April 20, 1869; Reissue No. 7,836, dated August 7, 1877. Application for reissue filed April 5, 1880.

*To all whom it may concern:*

Be it known that we, GEORGE M. RICHARDSON and CHARLES C. RICHARDSON, of Dana, in the county of Worcester and State of Massachusetts, have invented certain new and useful improvements in that class of wheeled horse hay-rakes in which, for the purpose of lifting the teeth, frictional connection is effected at the will of the operator between them and some one or more of the revolving parts, of which the following is a specification.

Figure 1:
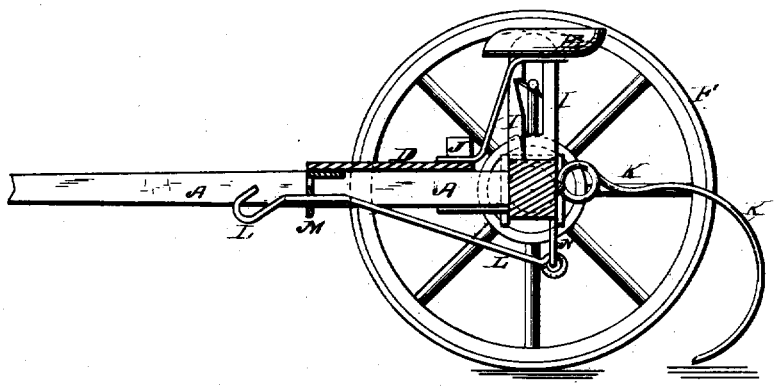
Figure 2:
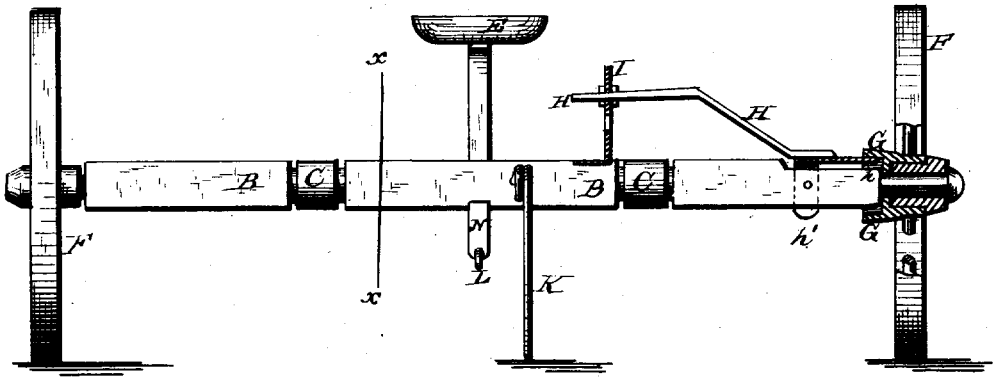

Figure 1 is a detail vertical section of our improved rake, taken through line *x x* of Fig. 2. Fig. 2 is a detail rear view of the same, parts being broken away to show the construction.

The same letters of reference indicate identical parts.

The object of our invention is twofold, to wit: first, to apply the friction-power against the revolving surface by moving the brake or brakes toward and from said surface in a line or lines transverse to the axis of rotation of the revolving part, on the principle first shown in Daly and Treat's patent, No. 36,897, dated November 11, 1862; and, secondly, to improve and simplify the structure of rakes operating on that principle by bringing the rake-head and rake-teeth closer to their axis of oscillation, and thus reducing their resisting leverage when dumping the hay, applying the friction-power nearer to the axle, and thus increasing the lifting leverage of the traction-wheels and doing away with all unnecessary weight and parts. To these ends we apply the friction-brakes directly against the hubs of the traction-wheels by causing the brake shoes or blocks to operate transversely against them, and we bring the surface of the rake-head so nearly in line with the surface of the hubs against which the brakes act that we are enabled to operate the brakes directly by a lever pivoted to the rake-head and extending along the head toward the driver's seat, the said lever having the brake-shoe pivoted to its outer end and having the operating power applied to its inner end.

Our invention consists, first, in a friction-brake acting transversely against the hub of the traction-wheel, in combination with an actuating-lever mounted upon the rake-head and extending in line therewith toward the driver's seat, said lever being pivoted to the rake-head near the hub of the traction-wheel, so that the end of its short arm, to which the brake block or shoe is attached, will move toward and from said hub in a line substantially transverse to the axis of rotation of the hub.

It consists, secondly, of a flange fixed upon a revolving part of the machine, in combination with a frictional brake, which serves to lock the said revolving part to that part which carries the teeth.

It consists, further, of certain details of construction, hereinafter more fully described and specifically claimed.

A are the thills, to the rear ends of which the axle B is connected by straps C, attached to the said rear end of the thills and passing around the said axle in grooves formed for their reception, or by an equivalent device, in such a way that the axle B may revolve, or partially revolve, on its bearings.

D is a platform attached to the rear part of the thills A, and by which the driver's seat E is supported.

F are the wheels, which are placed and revolve upon the axle B in the ordinary manner. The inner end of the hub of one or both the wheels F is formed with a projecting band or flange, G, or has a cup-shaped recess formed in it, as shown in Fig. 2.

H is a lever, which is pivoted to the axle B by means of the ears or straps *h'*, formed upon the said lever H, as shown in Fig. 2. Upon the outer end of the lever H is formed, or to it is attached, a block or shoe, *h*, fitting upon the inner or concave surface of the band or flange G, so that the said axle may be carried around by the revolution of the said wheel, the lever H and band G acting as a friction-brake. The inner end of the lever H passes through the slotted guide-arm I and extends inward into such a position as to be readily reached and operated by the driver from his seat. The lever H is provided with a catch, which takes hold of a notch formed in the slotted arm I, to hold the block *h* in contact with the band or flange G of the wheel F. The lower end of the guide-arm I is securely attached to the axle B, and said arm may have another notch formed in it, into which the lever H may catch to hold the block *h* away from the flange of the wheel F.

J is a stop or arm attached to the platform D or thills A in such a position that as the axle B is revolved by the wheel F the lever H may strike against the stop J and be lifted out of the notch in the slotted arm I, allowing the friction-block *h* to drop away from the band of the wheel F, and allowing the rake-teeth to drop to the ground to again gather the hay.

K are the rake-teeth, which are securely attached to the rear side of the axle B, and which are formed with a coil or bend near the axle B, as shown in Figs. 1 and 2, so that they may spring or twist to pass any obstruction against which they may strike, each tooth in this respect acting independently of the others. No improvement, however, is claimed in respect to the construction or attachment of the rake-teeth, and any satisfactory mode may be employed instead of that herein shown.

L is the draft-bar, which passes through a guide or support, M, attached to the forward part of the platform D, and the rear end of which is pivoted to an arm or lever, N, the upper end of which is securely attached to the axle B. By this arrangement of the draft-bar the draft-strain is made to hold the rake-teeth down to the ground, and is also made to bring the rake-teeth down quickly when the lever H is disengaged by the stop J.

We claim as our invention—

1. In a horse hay-rake, the combination of a revolving traction-wheel, an oscillating rake-head, a friction-brake moving toward and from the hub of the traction-wheel in a line transverse to the axis thereof, and acting against said hub for the purpose of locking the rake-head thereto, and thus raising the teeth by the draft of the team, and a brake-lever pivoted to the rake-head near the end of the latter, and thence extending toward the middle of said rake-head, for the purpose of applying the brake at the will of the operator, substantially as described.

2. In a wheeled horse hay-rake, the combination of the revolving hollow flange G with the partially-revolving rake-head, and the friction-brake applied to the concave of the flange, substantially as described.

3. The combination of the band or flange G, lever H *h′ h*, and slotted arm I with each other, and with the axle B and wheel F, substantially as herein shown and described, and for the purpose set forth.

GEORGE M. RICHARDSON.
CHARLES C. RICHARDSON.

Witnesses:
JEROME WILMARTH,
WM. R. WARREN.